(12) United States Patent
Mou

(10) Patent No.: US 11,941,891 B2
(45) Date of Patent: Mar. 26, 2024

(54) METHOD FOR DETECTING LANE LINE, VEHICLE AND COMPUTING DEVICE

(71) Applicant: OmniVision Sensor Solution (Shanghai) Co., Ltd, Shanghai (CN)

(72) Inventor: Xiaozheng Mou, Shanghai (CN)

(73) Assignee: OMNIVISION SENSOR SOLUTION (SHANGHAI) CO., LTD., Shanghai (CN)

( * ) Notice: Subject to any disclaimer, the term of this patent is extended or adjusted under 35 U.S.C. 154(b) by 468 days.

(21) Appl. No.: 17/324,197

(22) Filed: May 19, 2021

(65) Prior Publication Data

US 2021/0279485 A1    Sep. 9, 2021

Related U.S. Application Data

(63) Continuation of application No. PCT/CN2018/120048, filed on Dec. 10, 2018.

(30) Foreign Application Priority Data

Nov. 27, 2018  (CN) .......................... 201811427450.3

(51) Int. Cl.
*G06V 20/56* (2022.01)
*B60R 1/00* (2022.01)
*B60W 30/12* (2020.01)

(52) U.S. Cl.
CPC .............. *G06V 20/588* (2022.01); *B60R 1/00* (2013.01); *B60W 30/12* (2013.01); *B60R 2300/802* (2013.01); *B60R 2300/804* (2013.01); *B60W 2420/403* (2013.01)

(58) Field of Classification Search
None
See application file for complete search history.

(56) References Cited

U.S. PATENT DOCUMENTS 6,549,124 B1 * 4/2003 Ishikawa ................ G08G 1/166
                                                                340/435
10,825,188 B1 * 11/2020 Tan ........................ G06F 18/217
(Continued)

FOREIGN PATENT DOCUMENTS

CN        105005771 A        10/2015
CN        107480646 A        12/2017
(Continued)

*Primary Examiner* — Tsung Yin Tsai
(74) *Attorney, Agent, or Firm* — IPRO, PLLC

(57) ABSTRACT

The present disclosure provides a method for detecting a lane line, a vehicle and a computing device. The method includes: generating an optical flow image in accordance with a series of event data from a dynamic vision sensor coupled to a vehicle; determining an initial search region including a start point of the lane line in accordance with the optical flow image; determining a center of gravity of the initial search region; determining a new search region through an offsetting operation on the center of gravity; determining a center of gravity of the new search region; repeating the steps of determining a new search region and determining a center of gravity of the new search region iteratively to acquire centers of gravity of a plurality of search regions; and determining the lane line in accordance with the centers of gravity of the plurality of search regions.

10 Claims, 5 Drawing Sheets

(56) References Cited

U.S. PATENT DOCUMENTS

| | | | | |
|---|---|---|---|---|
| 2001/0010540 A1* | 8/2001 | Ogura | ............... | H04N 7/188 |
| | | | | 348/136 |
| 2010/0110193 A1* | 5/2010 | Kobayashi | ............ | G06V 20/58 |
| | | | | 348/149 |
| 2014/0009617 A1* | 1/2014 | Utagawa | ............... | G08G 1/166 |
| | | | | 348/148 |
| 2015/0317525 A1* | 11/2015 | Stein | ............... | B60W 40/076 |
| | | | | 382/104 |
| 2018/0048867 A1* | 2/2018 | Stein | ............... | G06V 20/588 |

FOREIGN PATENT DOCUMENTS

| | | | | |
|---|---|---|---|---|
| CN | 107944350 A | 4/2018 | | |
| CN | 108074247 A | 5/2018 | | |
| CN | 108450058 A | 8/2018 | | |
| CN | 108764078 A | 11/2018 | | |
| EP | 3779864 A1 * | 2/2021 | ......... | G06K 9/00744 |
| WO | WO-2020107523 A1 * | 6/2020 | ............ | B60R 1/00 |
| WO | WO-2022251697 A1 * | 12/2022 | .......... | B60W 60/001 |

* cited by examiner

METHOD FOR DETECTING LANE LINE, VEHICLE AND COMPUTING DEVICE

CROSS-REFERENCE TO RELATED APPLICATION

The present application claims a priority of the Chinese patent application No. 201811427450.3 filed on Nov. 27, 2018, which is incorporated herein by reference in its entirety.

TECHNICAL FIELD

The present disclosure relates to the field of driver assistant technology, in particular to a scheme for detecting a lane line.

BACKGROUND

Along with the rapid development of automobile industry, the quantity of vehicles increases year by year, and there is a significant damage to the safety of life and property due to traffic accidents. As pointed out in Global Status Report on Road Safety 2013 issued by the WHO, about 1.24 millions of people die every year due to the traffic accidents all over the world, and road traffic injury is one of the top eight causes of death.

In order to improve the road traffic safety, many institutions and automobile enterprises have put efforts in the research and development of an automobile safeguard system. Taking the detection of a lane line as an example, the lane line on a road is detected in a running process of a vehicle, so as to ensure that the vehicle runs in a lane, thereby to prevent the vehicle from colliding with the other vehicle when it runs over the lane. This is of great significance for driving safety.

In an existing lane line detection technology, usually an original image is pretreated at first (e.g., edge detection) to acquire edge information about the image. Next, edge points of the lane line is extracted in accordance with the acquired edge information, and then a curve of the lane is fitted in accordance with the edge points of the lane line. However, the extraction of the edge points through this method leads to a relatively large computation burden, so a large quantity of computation resources need to be consumed and a detection speed may be adversely affected. In addition, in an application scenario where the lane line is detected, usually the lane line needs to be detected rapidly to help a driver and prevent the occurrence of the traffic accident.

Hence, there is an urgent need to provide a scheme for detecting the lane line rapidly and accurately.

SUMMARY

An object of the present disclosure is to provide a lane line detection scheme, so as to solve, or at least relieve, at least one of the above-mentioned problems.

In one aspect, the present disclosure provides in some embodiments a method for detecting a lane line to be executed by a computing device, including: generating an optical flow image in accordance with a series of event data from a dynamic vision sensor coupled to a vehicle, each event being triggered by movement of an object in a scenario relative to the dynamic vision sensor; determining an initial search region including a start point of the lane line in accordance with the optical flow image; determining a center of gravity of the initial search region; determining a new search region through an offsetting operation on the center of gravity; determining a center of gravity of the new search region; repeating the steps of determining a new search region and determining a center of gravity of the new search region iteratively to acquire centers of gravity of a plurality of search regions; and determining the lane line in accordance with the centers of gravity of the plurality of search regions.

In a possible embodiment of the present disclosure, the dynamic vision sensor is arranged at a front end of the vehicle. The method further includes marking a position of a start point of a left lane line and a position of a start point of a right lane line in advance in accordance with a position of the dynamic vision sensor.

In a possible embodiment of the present disclosure, the determining the initial search region including the start point of the lane line in accordance with the optical flow image includes: determining an initial first search region including the start point of the left lane line in accordance with the optical flow image; and determining an initial second search region including the start point of the right lane line in accordance with the optical flow image.

In a possible embodiment of the present disclosure, the determining the initial search region including the start point of the lane line in accordance with the optical flow image further includes determining a noise region including noise pixels in accordance with the optical flow image.

In a possible embodiment of the present disclosure, prior to determining the center of gravity of the initial search region, the method further includes: calculating a proportion of the quantity of noise pixels in the noise region to the total quantity of pixels in the noise region; when the proportion is greater than a threshold, taking a lane line in a previous image frame as a lane line in a current image frame; and when the proportion is smaller than the threshold, determining the center of gravity of the initial search region.

In a possible embodiment of the present disclosure, the determining the center of gravity of the initial search region includes: selecting pixels that meet a first predetermined condition in the initial first search region and the initial second search region; and calculating average coordinates of the selected pixels in each of the initial first search region and the initial second search region to acquire the center of gravity of each of the initial first search region and the initial second search region.

In a possible embodiment of the present disclosure, the determining the new search region through the offsetting operation on the center of gravity includes: offsetting the center of gravity through a predetermined rule to acquire a center of the new search region; and determining a new first search region and a new second search region in accordance with the center of the new search region.

In a possible embodiment of the present disclosure, the determining the center of gravity of the new search region includes: selecting pixels that meet the first predetermined condition in the new first search region and the new second search region; and calculating average coordinates of the selected pixels in each of the new first search region and the new second search region to acquire a center of gravity of each of the new first search region and the new second search region.

In a possible embodiment of the present disclosure, the repeating the steps of determining the new search region and determining the center of gravity of the new search region iteratively to acquire the centers of gravity of the plurality of search regions includes, when a new search region meets a second predetermined condition, terminating the iteration.

The second predetermined condition includes that each of an upper boundary of the new first search region and an upper boundary of the new second search region is at a level not higher than a corresponding predetermined position, and the predetermined position is marked in advance in accordance with the position of the dynamic vision sensor.

In a possible embodiment of the present disclosure, the determining the lane line in accordance with the centers of gravity of the plurality of search regions includes acquiring, through fitting, the left lane line and the right lane line in the current image frame in accordance with the center of gravity of each first search region and the center of gravity of each second search region respectively.

In a possible embodiment of the present disclosure, the acquiring, through fitting, the left lane line and the right lane line in the current image frame in accordance with the center of gravity of each first search region and the center of gravity of each second search region respectively includes acquiring, through fitting, the left lane line and the right lane line in the current image frame using a least square method.

In a possible embodiment of the present disclosure, the event data includes a coordinate position and a timestamp of each triggered event. The generating the optical flow image in accordance with a series of event data from the dynamic vision sensor coupled to the vehicle includes: dividing the event data within a predetermined interval into a predetermined quantity of event segments in a chronological order of the timestamps; assigning different pixel values for events in different event segments; and generating the optical flow image in accordance with a coordinate position and a pixel value of each event.

In a possible embodiment of the present disclosure, the assigning different pixel values for the events in different event segments includes assigning different pixel values for the events in a chronological order of the events. When a timestamp corresponding to an event in an event segment is larger, a larger pixel value is assigned for the event in the event segment, and when a timestamp corresponding to an event in an event segment is smaller, a smaller pixel value is assigned for the event in the event segment.

In another aspect, the present disclosure provides in some embodiments a computing device, including one or more processors, a memory, and one or more programs stored in the memory and executed by the one or more processors. The one or more programs includes instructions for implementing the above-mentioned method.

In yet another aspect, the present disclosure provides in some embodiments a computer-readable storage medium storing therein one or more programs including instructions. The instructions are executed by a computing device so as to implement the above-mentioned method.

In still yet another aspect, the present disclosure provides in some embodiments a vehicle including the above-mentioned computing device, and a dynamic vision sensor coupled to the computing device and configured to record movement of an object in a scenario relative to the dynamic vision sensor and generate event data in accordance with an event triggered by the movement.

According to the embodiments of the present disclosure, the dynamic vision sensor may be arranged in the vehicle, the optical flow image may be generated in accordance with a series of event data from the dynamic vision sensor, and the optical flow image may carry optical flow information generated in a running process of the vehicle. Then, the search regions including the left and right lane lines may be determined in the optical flow image, and the left and right lane lines may be acquired, through fitting, in accordance with the search regions. In this way, it is able to determine the search regions to search for key points of the lane lines and fit the curve of the lane line, without any pretreatment such as edge detection. As a result, through the scheme for detecting the lane line in the embodiments of the present disclosure, it is able to remarkably reduce the computation burden for the lane line detection, and improve the robustness of an algorithm.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Recently, a Dynamic Vision Sensor (DVS) has attracted more and more attentions in the field of computer vision technology. The DVS is a biologically-mimic vision sensor for simulating a pulse-triggered neuron-based human retina, and it is provided with an array consisting of a plurality of pixel units. Each pixel unit may response to, and record an area where a light intensity changes rapidly merely when a light intensity change has been sensed. A specific constitution of the DVS will not be particularly defined herein. An event-triggered processing mechanism is adopted by the DVS, so it may output an asynchronous event data flow. The event data flow may be, for example, light intensity change information (e.g., a timestamp of the light intensity change and a light intensity threshold) and a coordinate position of a triggered pixel unit. Based on the above-mentioned operating principle, it is found that, as compared with a conventional vision sensor, the DVS has the following advantages. 1) The DVS is capable of detecting a high-speed object moving at a speed of up to ten thousand frames per second, without any restraint from an exposure time and a frame rate. 2) The DVS has a larger dynamic range, and it is capable of accurately sensing and output a scenario change even in a low-light or highly-exposed environment. 3) The DVS has lower power consumption. 4) Each pixel unit in the DVS responds to the light intensity change independently, so the DVS is not affected by motion blur.

Based on the above, the present disclosure provides in some embodiments a DVS-based lane line detection scheme, so as to reduce the computation burden and improve the robustness as compared with the related art. In addition, the scheme in the embodiments of the present disclosure fills a gap in the DVS-based lane line detection method.

Figure 1:
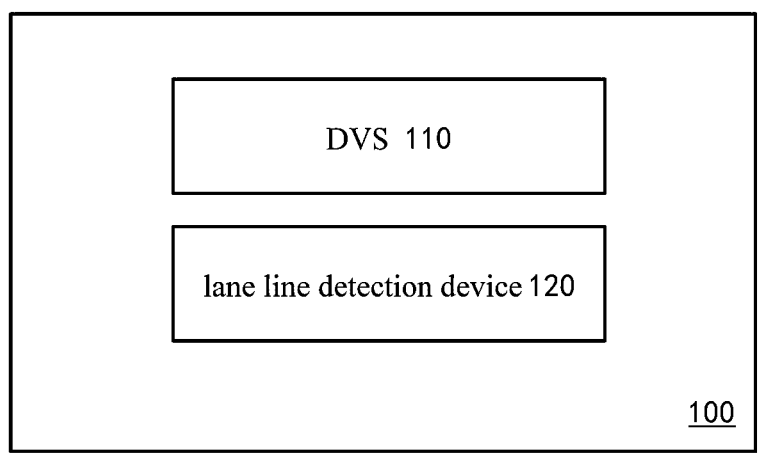
FIG. 1 is a schematic view showing a vehicle 100 according to one embodiment of the present disclosure.

The present disclosure provides in some embodiments a vehicle for implementing the lane line detection scheme. FIG. 1 is a schematic view showing the vehicle 100 according to one embodiment of the present disclosure.

As shown in FIG. 1, apart from a basic configuration, the vehicle 100 further includes a DVS 110 and a lane line detection device 120. In some embodiments of the present disclosure, the DVS 110 may be arranged at a front end of the vehicle 100, especially at a middle position. For example, the DVS 110 may be secured onto a central console of the vehicle 100, but a position of the DVS shall not be limited thereto, as long as the DVS 110 is capable of clearly collecting environment data (especially relevant data including a lane line) outside the vehicle 100 in a running process. During the arrangement, the position of the DVS 110 may be debugged multiple times based on the experiences, until the DVS is arranged at the position that meets the above condition. In addition, the DVS 110 may be further coupled to the lane line detection device 120, so as to transmit the collected data to the lane line detection device 120. Then, the lane line detection device 120 may process the data and detect the lane line on a road.

In the embodiments of the present disclosure, in the running process of the vehicle 100, the DVS 110 may collect in real time event data in a scenario. When there is no object in the scenario that moves relative to the vehicle 100 (i.e., the DVS 110), brightness of each pixel unit in the DVS may not change, i.e., no content may be displayed. Once it is detected that an object in the scenario moves relative to the vehicle 100 (i.e., light changes), a pixel event (also called as "event" for short) may be triggered, and an event data flow of a dynamic pixel (i.e., a pixel unit whose brightness changes) may be outputted. Each piece of event data in the event data flow may at least include a coordinate position of a triggered event (i.e., the pixel unit whose brightness changes) and timestamp information about a triggering time point.

In addition, the lane line detection device 120 may be a separate module in the vehicle 100, or a part of a vehicle-mounted device or a central control unit of the vehicle 100, which will not be particularly defined herein. In the embodiments of the present disclosure, the lane line detection device 120 may be implemented through a computing device.

Figure 2:
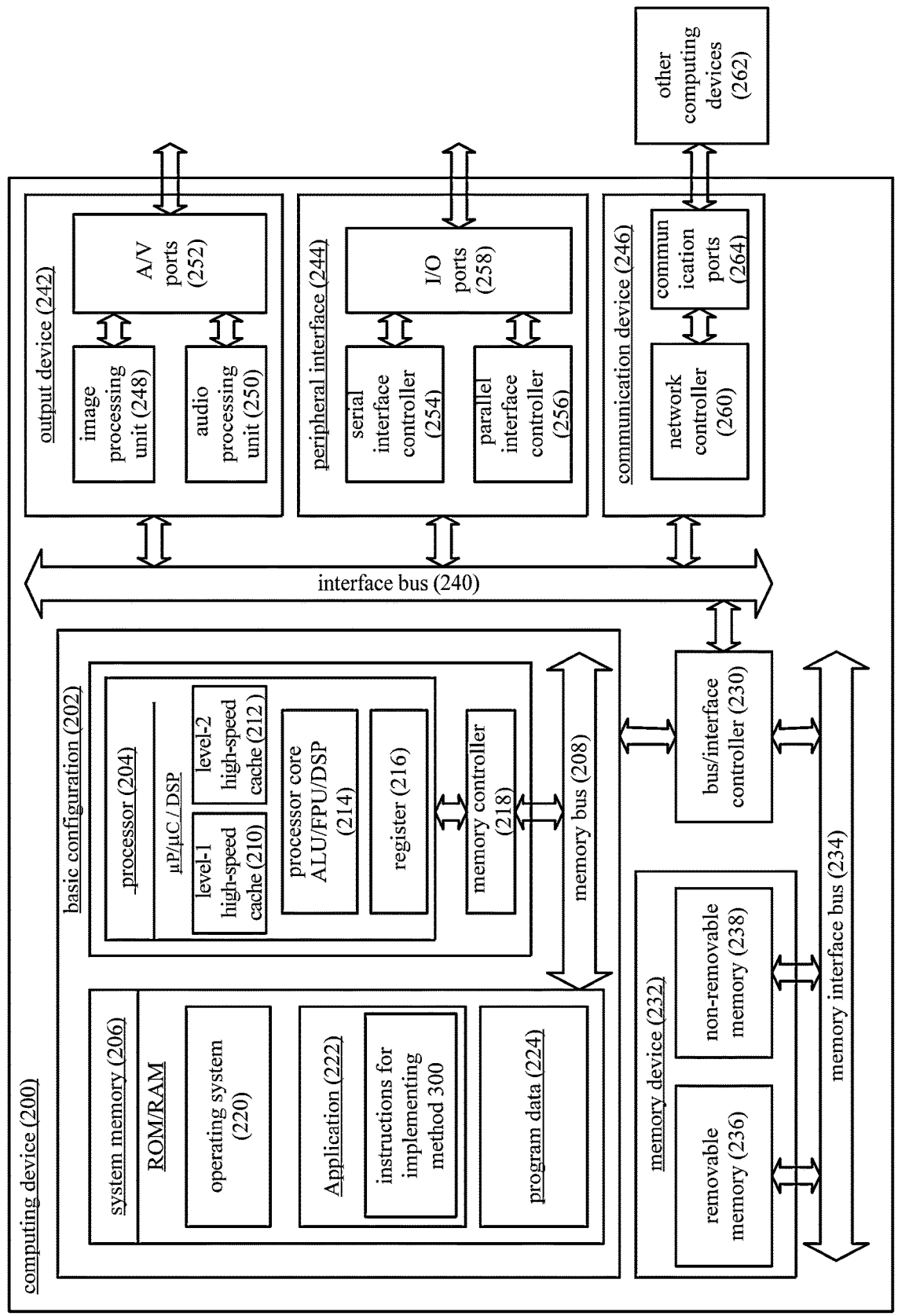
FIG. 2 is a schematic view showing a computing device 200 according to one embodiment of the present disclosure.

FIG. 2 is a block diagram of a computing device 200. As shown in FIG. 2, in a basic configuration 202, the computing device 200 typically includes a system memory 206 and one or more processors 204. A memory bus 208 may be used for the communication between the processor 204 and the system memory 206.

Depending on a desired configuration, the processor 204 may be of any type, and it may include, but not limited to, microprocessor (µP), microcontroller (µC), Digital Signal Processor (DSP), or a combination thereof. The processor 140 may include one or more levels of high-speed caches (e.g., a level-1 high-speed cache 210 and a level-2 high-speed cache 212), a processor core 214 and a register 216. The processor core 214 may include an Arithmetic Logical Unit (ALU), a Float Point Unit (FPU), a DSP core, or a combination thereof. A memory controller 218 may be used together with the processor 204, or in some embodiments of the present disclosure, the memory controller 218 may be an internal component of the processor 204.

Depending on a desired configuration, the system memory 206 may be of any type, and it may include, but not limited to, volatile memory (e.g., Random Access Memory (RAM)), non-volatile memory (e.g., Read Only Memory (ROM) or flash memory), or a combination thereof. The system memory 206 may include an operating system 220, one or more applications 222, and program data 224. In some embodiments of the present disclosure, the application 222 may be operated by the one or more processor 204 using the program data 224 on the operating system.

The computing device 200 may further include an interface bus 240 for the communication between various interface devices (e.g., an output device 242, a peripheral interface 244 and a communication device 246) and the basic configuration 202 via a bus/interface controller 230. The output device 242 may include a graphical processing unit 248 and an audio processing unit 250, which are configured to facilitate the communication with various external devices, e.g., display and loudspeaker, via one or more A/V ports 252. The peripheral interface 244 may include a serial interface controller 254 and a parallel interface controller 256, which are configured to facilitate the communication with the external devices, such as input devices (e.g., keyboard, mouse, pen, voice input device and image input device) or the other devices (e.g., printer or scanner) via one or more I/O ports 258. The communication device 246 may include a network controller 260, which is configured to communicate with one or more other computing devices 262 using a network communication link via one or more communication ports 264.

The network communication link may be an instance of a communication medium. Usually, the communication medium may be embodied as a computer-readable instruction, data structure or program module in a modulated data signal such as carrier or the other transmission mechanism, and it may include any information delivery medium. For the so-called modulated data signal, one or more data sets of the modulated data signal or the modulated data signal itself may be changed through encoding information in a signal. As a non-restrictive example, the communication medium may include a wired medium (e.g., wired network or private wire network), or a wireless medium (e.g., sound, Radio Frequency (RF), microwave, infrared (IR) or the like). The term "computer-readable medium" may include both the memory medium and the communication medium.

The computing device 200 may be a personal computer, e.g., desk-top computer or laptop computer. Of course, the computing device 200 may also be a part of a small-size portable (or mobile) electronic device, e.g., cellular phone, digital camera, PDA, Personal Media Player, wireless network browser, heat-mounted device, application-specific device, or a device including the above functions. Of course, the computing device 200 may also be implemented as a server, e.g., a file server, a database server, an application server or a web server, which will not be particularly defined herein.

In the embodiments of the present disclosure, the computing device 200 is configured to implement a method 300 for detecting a lane line. The application 222 of the computing device 200 may include a plurality of program instructions for implementing the method 300.

Figure 3:
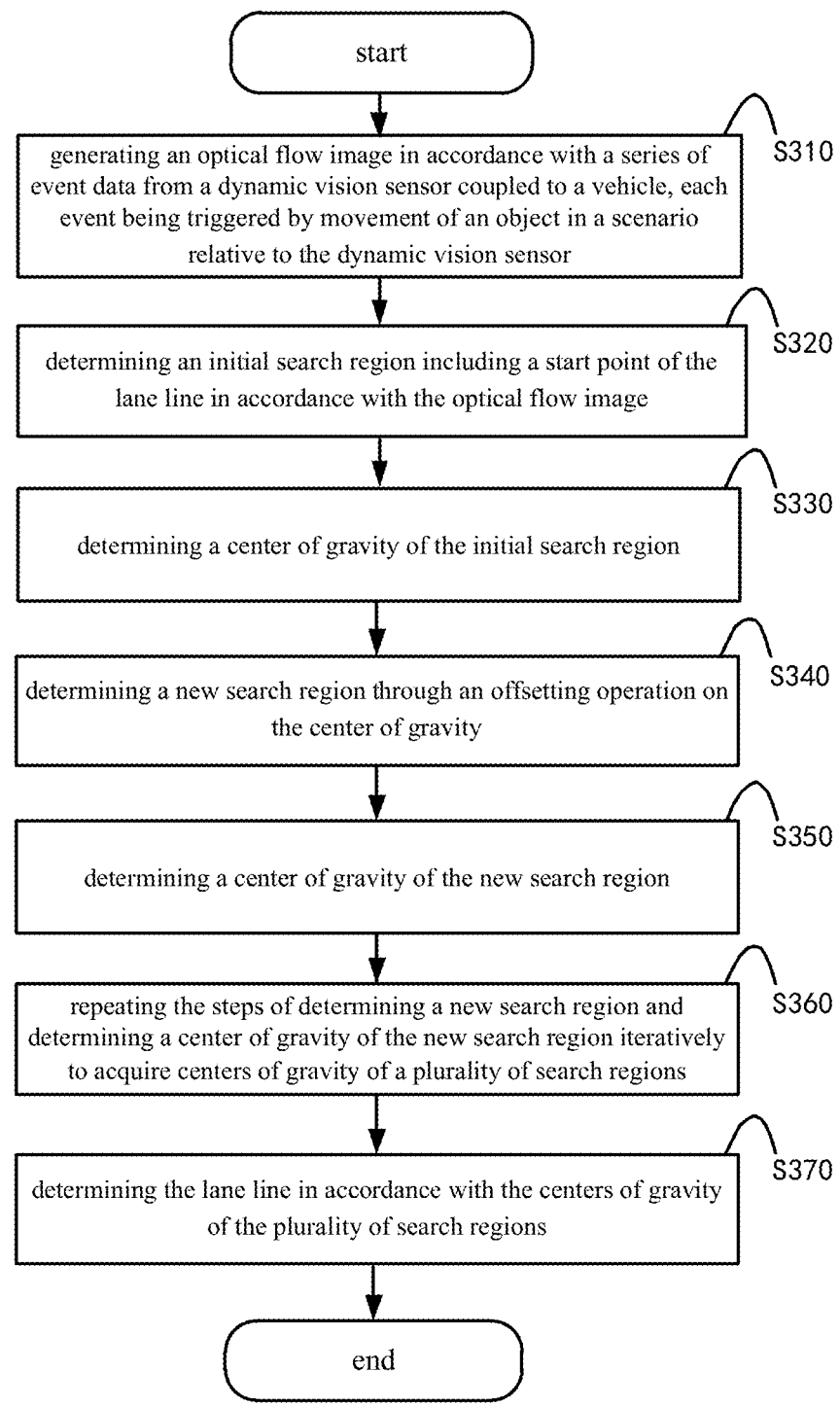
FIG. 3 is a flow chart of a method 300 for detecting a lane line according to one embodiment of the present disclosure.

The present disclosure provides in some embodiments the method 300 for detecting a lane line which, as shown in FIG. 3, includes the following steps.

Step S310: generating an optical flow image in accordance with a series of event data from a DVS 110 coupled to a vehicle 100. As mentioned hereinabove, each event may be triggered by movement of an object in a scenario relative to the DVS 110, and the event data from the DVS 110 may include a coordinate position and a timestamp for a triggering time of the event.

In the embodiments of the present disclosure, the optical flow image may be generated in accordance with a series of event data from the DVS 110 at a predetermined interval. A length of the interval may be set according to experiences and an actual scenario, e.g., it may be set as 20 ms, 40 ms or 60 ms, which will not be particularly defined herein. In a possible embodiment of the present disclosure, the optical flow image may be generated as follows.

At first, the event data within the predetermined interval may be divided into a predetermined quantity of event segments in a chronological order of the timestamps. In a possible embodiment of the present disclosure, the predetermined quantity may be 255. For example, the event data within the predetermined interval may be divided into 255 event segments in a chronological order of the timestamps. It should be appreciated that, a length of each event segment will not be particularly defined herein, and in some embodiments of the present disclosure, the event segments may have a substantially consistent length.

Next, different pixel values may be assigned for the events in different event segments. In a possible embodiment of the present disclosure, a same pixel value may be assigned for all events in one event segment, and different pixel values may be assigned for the events in a chronological order of the events. In a possible embodiment of the present disclosure, when a timestamp corresponding to an event in an event segment is larger (i.e., when the event occurs later), a larger pixel value may be assigned for the event in the event segment, and when a timestamp corresponding to an event in an event segment is smaller (i.e., when the event occurs earlier), a smaller pixel value may be assigned for the event in the event segment. For example, grayscale values 1 to 255 may be assigned for the events in 255 event segments in a chronological order of the timestamps.

Finally, the optical flow image may be generated in accordance with the coordinate position and the pixel value of each event. In a possible embodiment of the present disclosure, a size of the optical flow image may be set to be identical to a size of a pixel unit array in the DVS 110, so that each pixel point in the optical flow image corresponds to one pixel unit in the DVS 110. The pixel value assigned for the triggered event may be written into a corresponding pixel point in the optical flow image, and a pixel value for each pixel point corresponding to the event that is not triggered may be set as 0.

It should be appreciated that, the predetermined quantity mentioned hereinabove may also be any integer greater than 1 (but not limited to 255). Here, the predetermined quantity is set as 255, so as to be consistent with the pixel values of a conventional grayscale image (in an 8-bit quantization scenario, the pixel values are 0 to 255), thereby to provide the generated optical flow image with a better visual effect (for ease of description, in the following, the predetermined quantity may be 255 and the pixel values of the generated optical flow image may be within the range of 0 to 255). Based on the above, in a 10-bit quantization scenario, the predetermined quantity may be set as 1023, and grayscale values 1 to 1023 may be assigned for the events in 1023 event segments in a chronological order of the timestamps. Of course, apart from the grayscale values, pixel values representing different colors may also be assigned for the events at different time points, which will not be particularly defined herein.

Step S320: determining an initial search region including a start point of the lane line in accordance with the optical flow image.

Usually, the optical flow image needs to at least include a left lane line and a right lane line on a lane where the vehicle 100 current runs. In a possible embodiment of the present disclosure, the determined initial search region shall include a start point of the left lane line and a start point of the right lane line. The determining the initial search region may include determining an initial first search region including the start point of the left lane line in accordance with the optical flow image and determining an initial second search region including the start point of the right lane line in accordance with the optical flow image. In the embodiments of the present disclosure, a size of each of the initial first search region and the initial second search region will not be particularly defined, and the size of the initial first search region may be different from that of the initial second search region, as long as the initial first search region and the initial second search region include pixels for the start points of the left lane line and the right lane line respectively. Hence, the initial search region, i.e., the initial first search region and the initial second search region, may be determined when the positions of the start points of the left lane line and the right lane line have been determined.

In a possible embodiment of the present disclosure, the positions of the start points of the lane lines may be determined as follows. Before determining the initial search region, the positions of the start points of the left lane line and the right lane line in the scenario may be set in advance in accordance with priori knowledge. The priori knowledge may be, for example, a position of the DVS 110 in the vehicle 100. In a possible embodiment of the present disclosure, the positions of the start points of the left lane line and the right lane line may be marked in advance in accordance with the position of the DVS 110. In other words, after the arrangement of the DVS 110, the positions of the start points of the left lane line and the right lane line may be marked in advance in the optical flow image approximately. Usually, the start points of the lane lines are located at a bottom region of the optical flow image. To be specific, the start point of the left lane line is usually located at the bottom left of the optical flow image, and the start point of the right lane line is usually located at the bottom right of the optical flow image. It should be appreciated that, while marking the start points of the lane lines, the position of the DVS 110 may be adjusted correspondingly, which will not be particularly defined herein as long as the optical flow image generated in accordance with the event data from the DVS 110 includes the left lane line and the right lane line.

In another possible embodiment of the present disclosure, when determining the initial search region, the method may further include determining a noise region including noise pixels in accordance with the optical flow image. It should be appreciated that, in the running process of the vehicle 100, usually the start points of the lane lines are located at the bottom, and at two sides, of the optical flow image, and pixels in a middle part of the bottom region in the optical flow image (i.e., a part between the start points of the two lane lines) are not triggered, i.e., pixel values of these pixels are 0. In a possible embodiment of the present disclosure, the bottom region of the optical flow image may be selected as the noise region. Identically, a size of the noise region will not be particularly defined herein, as long as the noise region includes the pixel points for a road surface in front of the vehicle 100 in the running process.

Figure 4A:
FIGS. 4A to 4D are schematic views showing an optical flow image and initial search regions according to one embodiment of the present disclosure.
Figure 4B:
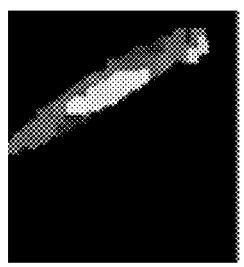
Figure 4C:
Figure 4D:

FIGS. 4A to 4D are schematic views showing the optical flow image and the initial search regions according to one embodiment of the present disclosure. FIG. 4A shows a scenario where the vehicle turns right, and the optical flow image is a grayscale image, with different grayscale values representing a chronological order of the events. The later the event is triggered, the larger the grayscale value of a corresponding pixel. As mentioned hereinabove, in order to improve a visual effect, the pixel points in different event segments may be represented by different colors. For example, red may be used to represent the pixels in an event segment whose timestamp is larger, and blue may be used to represent the pixels in an event segment whose timestamp is smaller. Of course, the present disclosure shall not be limited thereto. FIGS. 4B to 4D show images of the initial search region and an image of the noise region determined in FIG. 4A. FIG. 4B shows the initial first search region including the start point of the left lane line, FIG. 4C shows the initial second search region including the start point of the right lane line, and FIG. 4D shows the noise region. In addition, the optical flow image in FIG. 4A relates to the scenario where the vehicle turns right, and based on perspectivism, a proportion of the pixels for the right lane line is greater than that of the pixels for the left lane line, so a size of the initial second search region may be greater than that of the initial first search region.

Step S330: determining a center of gravity of the initial search region.

The center of gravity of the initial search region may be determined through the following two steps.

In a first step, pixels that meet a first predetermined condition may be selected in the initial first search region and the initial second search region. To be specific, the pixels that meet the first predetermined condition may be selected in the initial first search region as a first set, and the pixels that meet the first predetermined condition may be selected in the initial second search region as a second set. The first predetermined condition may be that the pixel value of the pixel in each search region is greater than a predetermined value (e.g., the predetermined value may be, but not limited to, any value in a range between 1 to 127, and it may be set in accordance with a range of the pixel values when generating the optical flow image; the larger the predetermined value, the later the event corresponding to the selected pixel is triggered). In a word, once the pixel corresponds to a triggered event, it may be determined that the pixel meets the first predetermined condition.

In a second step, average coordinates of the selected pixels in each of the initial first search region and the initial second search region may be calculated to acquire the center of gravity of each of the initial first search region and the initial second search region. After the first step, the average coordinates of all the pixels in the first set may be calculated to acquire the center of gravity of the initial first search region, i.e., a first center of gravity. In addition, the average coordinates of all the pixels in the second set may be calculated to acquire the center of gravity of the initial second search region, i.e., a second center of gravity.

In some embodiments of the present disclosure, in order to further improve the detection accuracy, prior to determining the center of gravity of the search region, whether the determined search region (i.e., the event data collected currently) is credible may be judged. When it is credible, the center of gravity of the initial search region may be determined through the above two steps, and when it is incredible, the subsequent steps will not be performed any more, and a lane line in a previous image frame may be directly taken as a lane line in a current image frame.

In a possible embodiment of the present disclosure, the above adjustment step may be performed in accordance with a proportion of a noise in the generated noise region. To be specific, a proportion of the quantity of noise pixels to the total quantity of pixels in the noise region may be calculated at first. As mentioned hereinabove, in the noise region, the pixel whose pixel value is greater than 0 may be just the noise pixel. In some embodiments of the present disclosure, the proportion of the noise pixels may be calculated through, but not limited to, a histogram of the noise pixels. Then, whether the search region is credible may be judged in accordance with the proportion. Usually, when the proportion of the noise in the noise region is too large, the search region may be considered to be incredible. In a possible embodiment of the present disclosure, when the proportion is greater than a threshold, the subsequent treatment will not be performed any more, and the lane line in the previous image frame may be directly taken as the lane line in the current image frame. When the proportion is smaller than the threshold, Step S330 may be performed to determine the center of gravity of the initial search region.

Step S340: determining a new search region through an offsetting operation on the center of gravity.

In a possible embodiment of the present disclosure, the offsetting operation may be performed on the center of gravity as follows.

(1) The center of gravity of the initial first search region (i.e., the first center of gravity) and the center of gravity of the initial second search region (i.e., the second center of gravity) may be offset using a predetermined rule to acquire a center of the new search region. In a possible embodiment of the present disclosure, the predetermined rule may include offsetting the first center of gravity horizontally to the right and vertically upward by a certain offset value with respect to the left lane line, and offsetting the second center of gravity horizontally to the left and vertically upward by a certain offset value with respect to the right lane line. It should be appreciated that, based on the predetermined rule, the first center of gravity may be directly moved by a certain offset value to a top right portion and the second center of gravity may be directly moved by a certain offset value to a top left portion. Of course, the first center of gravity (or the second center of gravity) may be moved by a certain offset value horizontally to the right (or horizontally to the left) and then moved by a certain offset value vertically upward; or it may be moved by a certain offset value vertically upward and then moved by a certain offset value horizontally to the right (or horizontally to the left), which will not be particularly defined herein. In addition, the offset value may be set in accordance with the position of the DVS 110, and identically it may be set when marking the positions of the start points of the left and right lane lines. The offset value will not be particularly defined herein, as long as the new search region after the offsetting operation includes the pixel points for the lane line.

(2) A new first search region and a new second search region may be determined in accordance with the center of the new search region. In a possible embodiment of the present disclosure, the new first search region may be created with the center of the new first search region as a center, and the new second search region may be created with the center of the new second search region as a center. It should be appreciated that, a size of the created new search region (i.e., the new first search region or the new second search region) may be the same as, or different from, a size of the initial search region (i.e., the corresponding initial first search region or initial second search region), which will not be particularly defined herein.

Step S350: determining a center of gravity of the new search region.

In a possible embodiment of the present disclosure, the determining the center of gravity of the new search region may include: selecting pixels that meet the first predetermined condition in the new first search region and the new second search region; and calculating average coordinates of the selected pixels in each of the new first search region and the new second search region to acquire a center of gravity of each of the new first search region and the new second search region. Specific description may refer to that in Step S330, and thus will not be particularly defined herein.

Through Steps S340 and S350, the new first search region and its center of gravity corresponding to the left lane line as well as the new second search region and its center of gravity corresponding to the right lane line may be determined.

Step S360: repeating the steps of determining a new search region and determining a center of gravity of the new search region iteratively to acquire centers of gravity of a plurality of search regions (i.e., repeating Steps S340 and S350 iteratively).

As mentioned hereinabove, for both the first search region corresponding to the left lane line and the second search region corresponding to the right lane line, a size of the new search region may be the same as, or different from, a size of the corresponding search region. For example, depending on perspectivism, the size of the new search region acquired after the offsetting may be smaller than the size of the search region before the offsetting.

To be specific, after acquiring the center of gravity of the initial search region, the center of gravity may be offset through Step S340 to acquire a center of the new search region, the new search region may be created in accordance with the center, and the center of gravity of the new search region may be determined through Step S350. Next, the center of gravity of the new search region may be offset to acquire a center of a new search region (i.e., Step S340), a new search region may be created in accordance with the center, and then a center of the new search region may be determined through Step S350, . . . , and so on, until the new search region meets the second predetermined condition. In the embodiments of the present disclosure, the second predetermined condition may include, when a new search region is determined each time, judging whether an upper boundary of the new search region is at a level higher than a predetermined position. When the upper boundary is at a level higher than the predetermined position, the iteration may be terminated, and the center of gravity of the new search region may not be calculated. In other words, whether an upper boundary of the new first search region is at a level higher than a predetermined position corresponding to the left lane line may be judged, and if yes, the iteration with respect to the left lane line may be terminated and the left lane line may be determined in accordance with the plurality of determined centers of gravity. Whether an upper boundary of the new second search region is at a level higher than a predetermined position corresponding to the right lane line may be judged, and if yes, the iteration with respect to the right lane line may be terminated and the right lane line may be determined in accordance with the plurality of determined centers of gravity.

The predetermined position may also be marked in advance in accordance with the position of the DVS 110. Generally, after the arrangement of the DVS 110, an approximate position of a horizon line may be marked in advance as the predetermined position in accordance with the position of the DVS 110. It should be appreciated that, the predetermined position corresponding to the left lane line may be different from that corresponding to the right lane line, which will not be particularly defined herein. In addition, the offsetting operations on the first search region and the second search region may be performed separately, and in the embodiments of the present disclosure, the quantity of offsetting operations on the first search region is unnecessarily equal to the quantity of offsetting operations on the second search region.

At this time, the initial first search region and the initial second search region corresponding to the left and right lane lines (i.e., the initial search region) are determined through Step S320, and the initial search region is offset for many times through Steps S340 to S360 to acquire the plurality of new first search regions and new second search regions. In other words, a plurality of first search regions (including the initial first search region and the new first search regions determined after offsetting) has been determined with respect to the left lane line, and a plurality of second search regions (including the initial second search region and the new second search regions determined after offsetting) has been determined with respect to the right lane line.

Figure 5:
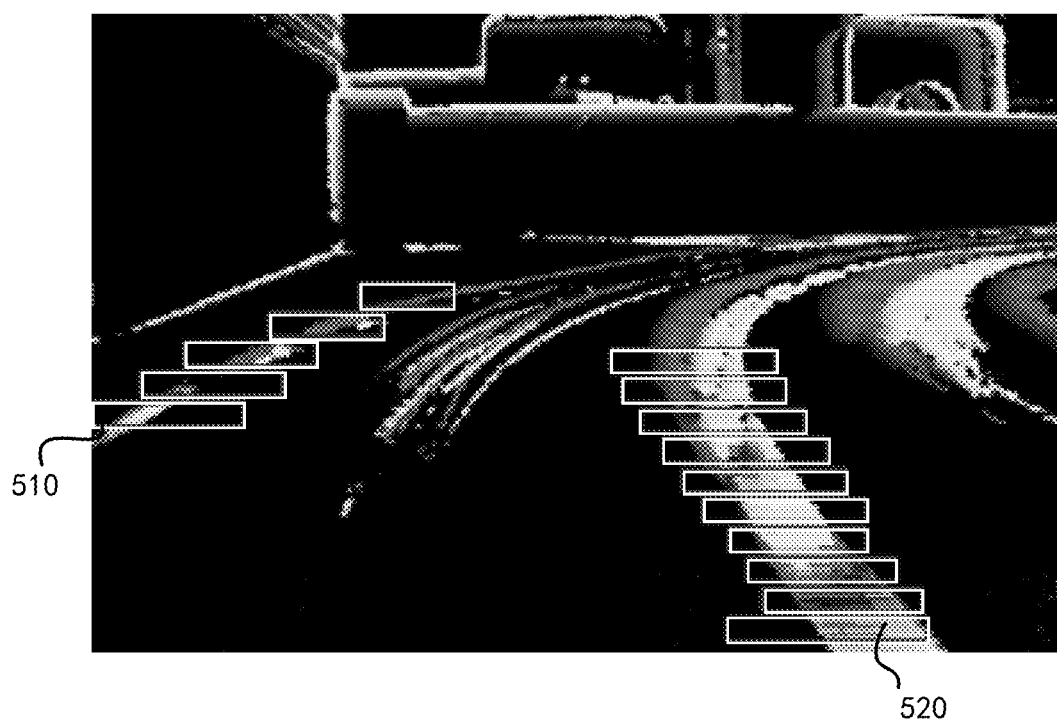
FIG. 5 is a schematic view showing search regions determined in the optical flow image according to one embodiment of the present disclosure.

FIG. 5 is a schematic view showing the search regions determined in the optical flow image according to one embodiment of the present disclosure. As shown in FIG. 5, in a left portion of the image, an initial search region 510 may be determined at first, and a center of gravity of the initial search region 510 may be offset to determine a new search region. Through four iterations, the other four search regions may be determined. In this way, there are totally five first search regions including the left lane line. Centers of gravity of the five search regions may be fitted to acquire an approximate curve of the left lane line. Identically, in a right portion of the image, an initial search region 520 may be determined at first, and a center of gravity of the initial search region 520 may be offset to determine a new search region. Through nine iterations, the other nine search regions may be determined. In this way, there are totally ten second search regions including the right lane line. Centers of gravity of the ten search regions may be fitted to acquire an approximate curve of right left lane line. It should be appreciated that, FIG. 5 is merely used to illustratively, rather than restrictively, show positions and shapes of the search regions.

Step S370: determining the lane line in accordance with the centers of gravity of the search regions (including the plurality of first search regions and the plurality of second search regions).

In a possible embodiment of the present disclosure, the left lane line and the right lane line in the current image frame may be acquired, through fitting, in accordance with the centers of gravity of the first search regions and the centers of gravity of the second search regions. In other words, with respect to the initial first search region and the plurality of new first search regions generated through iterations, the left lane line in the current image frame may be acquired, through fitting, in accordance with their centers of gravity. Identically, with respect to the initial second search region and the plurality of new second search regions generated through iterations, the right lane line in the current image frame may be acquired, through fitting, in accordance with their centers of gravity.

In a possible embodiment of the present disclosure, the left lane line in the current image frame may be acquired, through fitting, in accordance with the centers of gravity of the first search regions using a least square method, and the right lane line in the current image frame may be acquired, through fitting, in accordance with the centers of gravity of the second search regions using a least square method. It should be appreciated that, a specific fitting method will not be particularly defined herein, i.e., any fitting algorithm may be adopted so as to acquire the lane line in the current image frame in accordance with the centers of gravity of the search regions.

The present disclosure provides a DVS-based lane line detection scheme, so as to solve such problems in the related art as a large computation burden and insufficient robustness. According to the method 300 in the embodiments of the present disclosure, considering such a feature that the DVS is sensitive to edge information, the DVS may be directly arranged in the vehicle, and the optical flow image carrying optical flow information may be generated in accordance with a series of optical flow data from the DVS. In addition, when generating the optical flow image, the pixel values in the optical flow image may correspond to a chronological order of the timestamps where the events are triggered, so as to facilitate the determination of the search regions subsequently and the fitting of the lane line in accordance with the search regions.

According to the embodiments of the present disclosure, it is unnecessary to perform any pretreatment such as edge detection, and the key points of each lane line may be searched and the curve of the lane line may be fitted through determining the search regions. As a result, it is able to reduce the computation burden for the lane line detection and improve the robustness.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

In addition, it should be appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

What is claimed is:

1. A method for detecting a lane line to be executed by a computing device, comprising:
generating an optical flow image in accordance with a series of event data from a dynamic vision sensor coupled to a vehicle, each event being triggered by movement of an object in a scenario relative to the dynamic vision sensor, wherein the dynamic vision sensor is arranged at a front end of the vehicle, wherein the method further comprises marking a position of a start point of a left lane line and a position of a start point of a right lane line in advance in accordance with a position of the dynamic vision sensor;
determining an initial search region comprising a start point of the lane line in accordance with the optical flow image, wherein the determining the initial search region comprises: determining an initial first search region comprising the start point of the left lane line in accordance with the optical flow image; and determining an initial second search region comprising the start point of the right lane line in accordance with the optical flow image;
determining a center of gravity of the initial search region, wherein the determining the center of gravity of the initial search region comprises: selecting pixels that meet a first predetermined condition in the initial first search region and the initial second search region; and calculating average coordinates of the selected pixels in each of the initial first search region and the initial second search region to acquire the center of gravity of each of the initial first search region and the initial second search region;

determining a new search region through an offsetting operation on the center of gravity, wherein the determining the new search region comprises: offsetting the center of gravity through a predetermined rule to acquire a center of the new search region; and determining a new first search region and a new second search region in accordance with the center of the new search region;

determining a center of gravity of the new search region, wherein the determining the center of gravity of the new search region comprises: selecting pixels that meet the first predetermined condition in the new first search region and the new second search region; and calculating average coordinates of the selected pixels in each of the new first search region and the new second search region to acquire a center of gravity of each of the new first search region and the new second search region;

repeating the steps of determining a new search region and determining a center of gravity of the new search region iteratively, to acquire centers of gravity of a plurality of search regions, wherein the repeating the steps of determining the new search region and determining the center of gravity of the new search region iteratively comprises: when a new search region meets a second predetermined condition, terminating the iteration, wherein the second predetermined condition comprises that each of an upper boundary of the new first search region and an upper boundary of the new second search region is at a level not higher than a corresponding predetermined position, and the predetermined position is marked in advance in accordance with the position of the dynamic vision sensor; and determining the lane line in accordance with the centers of gravity of the plurality of search regions.

2. The method according to claim 1, wherein the determining the initial search region comprising the start point of the lane line in accordance with the optical flow image further comprises determining a noise region comprising noise pixels in accordance with the optical flow image.

3. The method according to claim 2, wherein prior to determining the center of gravity of the initial search region, the method further comprises: calculating a proportion of the quantity of noise pixels in the noise region to the total quantity of pixels in the noise region; when the proportion is greater than a threshold, taking a lane line in a previous image frame as a lane line in a current image frame; and when the proportion is smaller than the threshold, determining the center of gravity of the initial search region.

4. The method according to claim 1, wherein the determining the lane line in accordance with the centers of gravity of the plurality of search regions comprises acquiring, through fitting, the left lane line and the right lane line in the current image frame in accordance with the center of gravity of each first search region and the center of gravity of each second search region respectively.

5. The method according to claim 4, wherein the acquiring, through fitting, the left lane line and the right lane line in the current image frame in accordance with the center of gravity of each first search region and the center of gravity of each second search region respectively comprises acquiring, through fitting, the left lane line and the right lane line in the current image frame using a least square method.

6. The method according to claim 5, wherein the event data comprises a coordinate position and a timestamp of each triggered event, wherein the generating the optical flow image in accordance with a series of event data from the dynamic vision sensor coupled to the vehicle comprises: dividing the event data within a predetermined interval into a predetermined quantity of event segments in a chronological order of the timestamps; assigning different pixel values for events in different event segments; and generating the optical flow image in accordance with a coordinate position and a pixel value of each event.

7. The method according to claim 6, wherein the assigning different pixel values for the events in different event segments comprises assigning different pixel values for the events in a chronological order of the events, wherein when a timestamp corresponding to an event in an event segment is larger, a larger pixel value is assigned for the event in the event segment, and when a timestamp corresponding to an event in an event segment is smaller, a smaller pixel value is assigned for the event in the event segment.

8. A computing device, comprising one or more processor, a memory, and one or more programs stored in the memory and executed by the one or more processors, wherein the one or more programs comprises instructions for implementing the method according to claim 1.

9. A vehicle, comprising the computing device according to claim 8, and a dynamic vision sensor coupled to the computing device and configured to record movement of an object in a scenario relative to the dynamic vision sensor and generate event data in accordance with an event triggered by the movement.

10. A non-transitory computer-readable storage medium storing therein one or more programs, wherein the one or more programs comprises instructions, and the instructions are executed by a computing device so as to implement the method according to claim 1.

* * * * *